April 17, 1962     I. CARLSON     3,029,926
CORN KICKER

Filed July 12, 1960     2 Sheets-Sheet 1

INVENTOR.
IVYL CARLSON
BY *Morton S. Adler*
ATTORNEY.

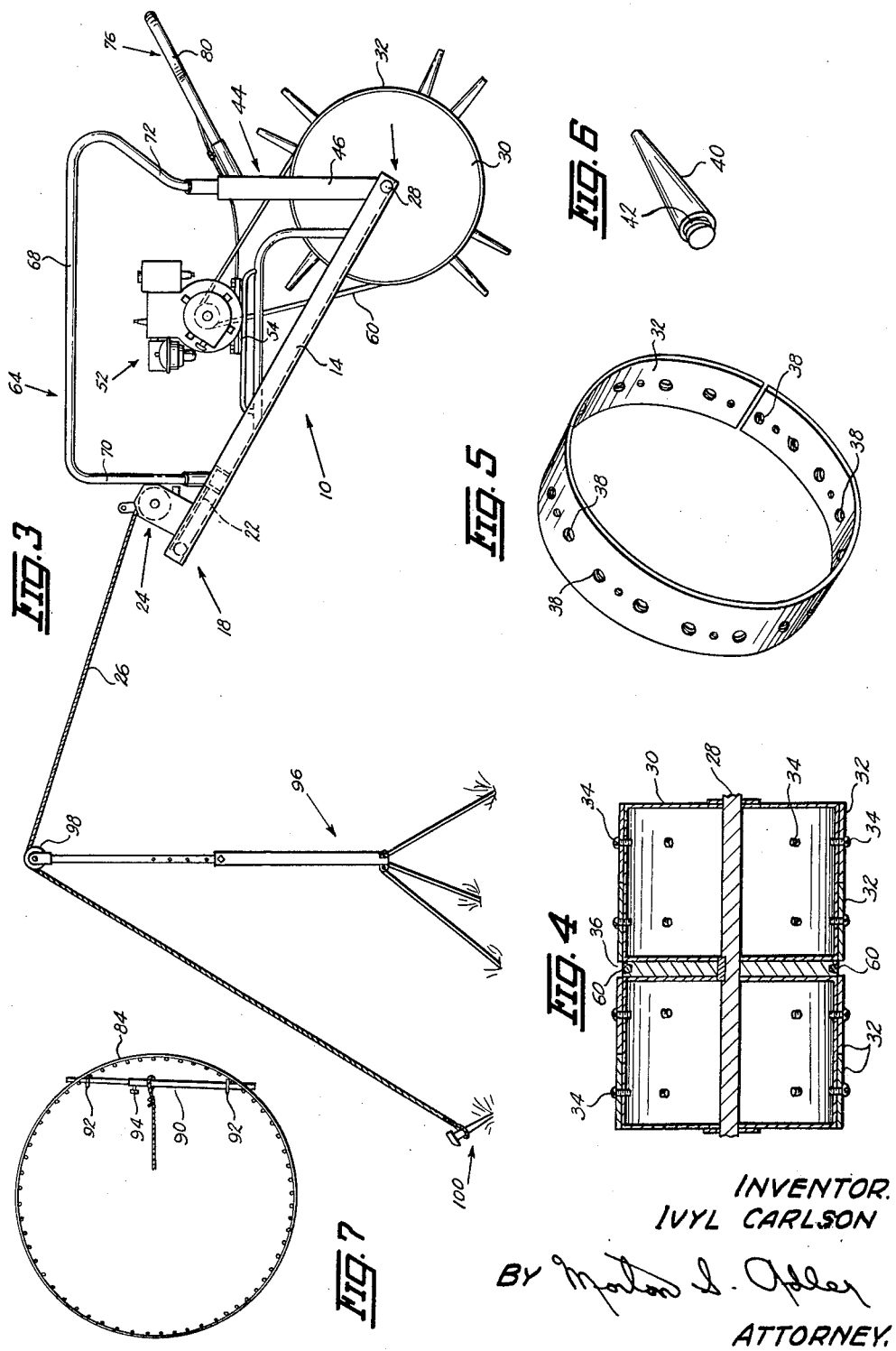

United States Patent Office 3,029,926
Patented Apr. 17, 1962

3,029,926
CORN KICKER
Ivyl Carlson, Rte. 2, Madrid, Iowa
Filed July 12, 1960, Ser. No. 42,371
13 Claims. (Cl. 198—128)

This invention relates to mobile apparatus designed for loosening packed ears of corn in a corn crib and impelling them towards a drag or conveyor, and which I shall refer to as a corn kicker.

When ears of corn are removed from a corn crib, a point will be reached in the lower portion of the crib where the ears are so tightly packed because of pressure from the weight of the corn previously on top of it that they are not easily separable and must be loosened by digging, poking and prying with some suitable tool. This is an extremely arduous task and is still performed manually on a substantial number of farms today. Certain complicated and expensive machinery has been designed to eliminate or reduce the burden imposed by this task but the cost and expense of such machinery is not warranted by the size of the farm operation of a great multitude of individual farmers.

Accordingly, one of the important objects contemplated by this invention is the provision of a simple but sturdy, efficient and relatively inexpensive mobile apparatus which can be maneuvered within a corn crib to loosen the packed ears of corn and impel or throw them into the drag on the bin floor for delivery to a point of deposit.

Another object is to provide apparatus as characterized which includes novel corn engaging means.

A further feature of the present invention resides in its adaptation for use under the control of two operators whereby its efficiency is materially enhanced.

Further objects and the more obvious advantages of the invention will be mentioned or else appear plainly from the description which follows.

Figure 1:
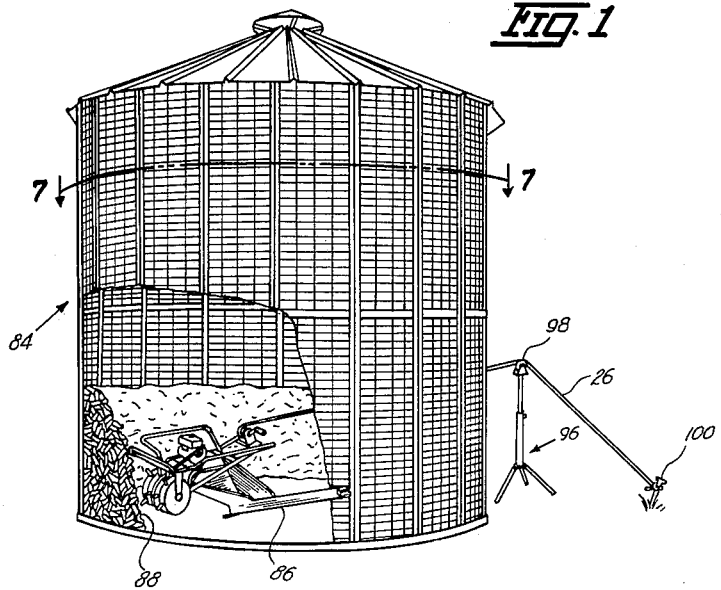
Figure 2:
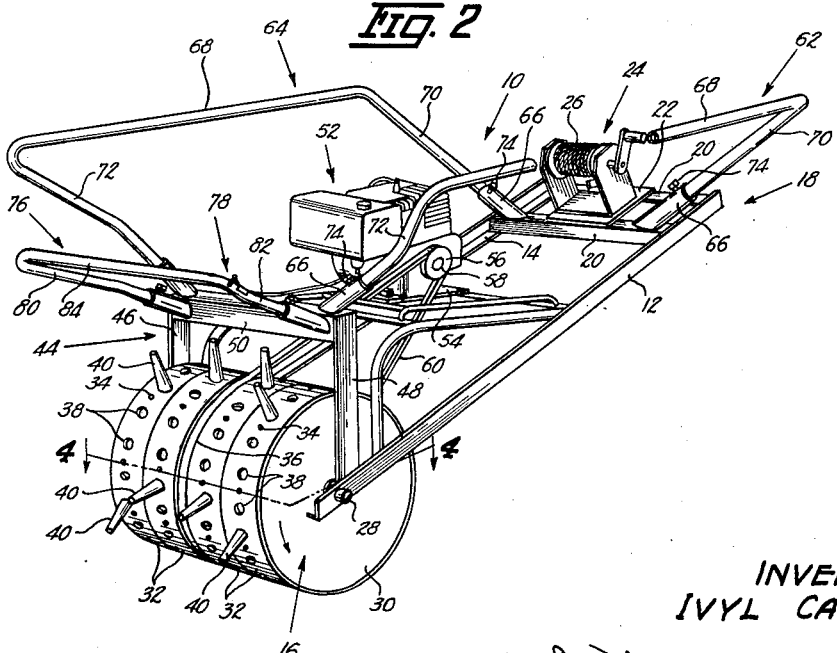

This invention consists of novel parts and combination of parts to be hereinafter described whereby the objects set forth are attained, as pointed out in the claims, and illustrated in the accompanying drawings, in which:

FIG. 1 is an elevational view of a corn crib partially broken away to illustrate this invention in use therein, FIG. 2 is an enlarged perspective view showing a preferred embodiment of this invention, FIG. 3 is a side view of the device shown in FIG. 2, FIG. 4 is a cross sectional view of the roller on this device taken on the line 4—4 of FIG. 2, FIG. 5 is an enlarged perspective view of the roller mounted band for carrying the corn engaging lugs, FIG. 6 is an enlarged perspective view of one of the lugs carried by the band in FIG. 5, and FIG. 7 is a view of the corn crib from the line 7—7 in FIG. 1 showing certain anchor means for this corn kicker which may be required in certain types of cribs.

Referring to the drawings this corn kicker is designated generally by the numeral 10 in FIG. 2 and comprises a pair of elongated frame or bar members 12 and 14 in parallel spaced relationship and having the respective forward end 16 and rear end 18. At the rear end 18, members 12 and 14 are connected by suitable bracing 20 on which is a platform 22 for supporting a winch assembly 24 having a length of cable or rope 26 wound thereon. At the forward end 16 an axle 28 is rotatably journalled between members 12 and 14 and carries the drum-like roller 30. A plurality of steel bar bands 32 are secured circumferentially to roller 30 by means of screws or the like 34 and are so arranged as to provide a circumscribing groove or track 36 on roller 30 (FIG. 4) at preferably a central point intermediate the roller ends. Bands 32 are provided with longitudinally spaced threaded holes 38 for removably receiving lug members 40 (FIG. 6). Lugs 40 are preferably of an elongated cone shape having a threaded shank 42 at their larger end for engagement in holes 38 but may be of any desired shape adapted to project radially from roller 30 when attached to bands 32 so long as they can engage and propel the ears of corn as will later appear. It will also be noted from FIG. 2 that I have preferably used four bands 32, two each on each side of groove 36 but the number of bands may be varied if desired. Also at the forward end 16, members 12 and 14 support a yoke-like frame 44 consisting of the upstanding members 46 and 48 connected by the cross bar 50.

A suitable motor 52, and preferably a gasoline motor, is mounted to a platform or base 54 secured to the forward end portion of members 12 and 14 directly behind yoke 44. Such motor 52 is of a type commercially available as used on power lawn mowers, for example, and includes the pulley 56 on shaft 58 for driving a belt 60 trained around roller 30 in the groove or track 36.

Handle members or units 62 and 64 of like construction extend upwardly and laterally outwardly relative to the respective frame members 12 and 14 and for this purpose an upwardly and laterally outwardly extending standard 66 is carried at each end by the rear platform 20 and the forward cross bar 50 as shown in FIG. 2. Handles 62 and 64 are preferably of tubular or rod material having the hand gripping portion 68 and integral arms 70 and 72, such arms being removably attachable to the respective standards 66 by means of set screws 74. Handle member portions 68 will thus be parallel to the respective frame members 12 and 14 but will be on a higher plane and laterally disposed outwardly from a vertical alignment therewith. It will also be noted that handle portions 68 extend forwardly beyond yoke 44 for purposes which will be explained later. A combination handle and bumper 76 projects forwardly and slightly upwardly from the cross bar 50 of yoke 44. Member 76 is of a modified U shape having the arms 80 and 82 secured to spaced points on bar 50 and the integral cross member 84 projecting to a point beyond a vertical line outside the forwardmost point of lugs 40 and having a length greater than the distance between the points of attachment to bar 50 so as to generally present a projecting bumper or handle with a flared forward end. Control levers 78 for motor 52 may be attached to the front handle 76 and for this purpose they are shown on members 82 although it will be understood that this is a matter of choice.

In operation, this machine 10 is used in a corn crib of which a wire mesh type is illustrated generally by the numeral 84 in FIG. 1. Handles 62 and 64 are removed for moving member 10 through the door (not shown) of the crib and are remounted on the inside as seen in FIG. 1. It will also be understood that a drag or conveyor illustrated generally at 86 will be on the floor of a bin for moving out the ears of corn 88 and when the removal of corn has reached a point that the ears 88 are tightly packed around the bottom and lower side, apparatus 10 is employed as follows for loosening the same and impelling them into the drag 86. Operation of motor 52 rotates drum 30 forwardly or counterclockwise as viewed in FIG. 2 whereby the lugs engage and dig into the pile of ears 88 to loosen the same. For this purpose I have arranged the lugs in pairs relative to the respective outer and inner bands 32, one pair being attached to the respective outer bands and in lateral alignment with each other and the other pair similarly arranged relative to the adjacent inner bands 32 but off-set rearwardly from the first pair relative to the direction of rotation. Each such two pairs of lugs constitutes a grouping and four equally spaced groupings of such lugs are preferably used as shown in FIG. 3.

Handles 62 and 64 are adapted to be held by respective operators with the rear end 18 of frame members 12 and 14 being elevated as shown. The position of such handles 62 and 64 and especially the forward portions thereof afford means for the operators to exert a downwardly force against roller 30 and this is supplemented by the weight of the motor 52 which is mounted just behind the yoke 44 for such purpose. Likewise, bumper 76 may also be utilized by the operators in holding roller 30 down if necessary and in addition serves as a guard against contact by lugs 40 with any of the bin structure.

As a means of restraining and controlling unlimited forward travel of the machine 10, I anchor the rear end 18 to a suitable support by means of the cable 26 and winch assembly 24. The type and form of support utilized as an anchor will depend upon the type of bin in which this machine is used. For example, in the wire mesh bin 84 shown where the mesh may not be strong enough to sustain the pull by cable 26, I place a longitudinally extensible bar or pipe 90 (FIG. 7) through the bin, such pipe having shoulders 92 to abut the bin on the inner side and a pin 94 to prevent it from telescoping. It is also feasible to use a vertically adjustable standard 96 located outside the bin and carrying a pulley 98 at the top. With this arrangement, cable 26 is passed through the mesh wall of the bin, over the pulley 98 and secured to a ground engaging anchor means 100. In some bins, however, sufficient structure is present in the form of bracing and beams on the inside so that cable 26 can be attached thereto and when such supports are aviable, other types are not necessary.

Cable 26 is attached as described at the diametrically opposite point in the bin from which machine 10 is working so that the direction of rotation of drum 30 is perpendicular to the longitudinal axis of the drag or conveyor 86. In this way the ears of corn 88, as they are loosened, are propelled or thrown by one pair of lugs or the other toward the drag 86 and experience has demonstrated that substantially seventy five percent of the loosened ears are deposited in the drag. What ears do not fall into the drag are loosely strewn about the bin floor where they can be easily picked up or shoveled and removed or placed in the drag. The length of cable 26 will determine the depth of penetration of roller 30 into the pile of ears and thus the operators on handles 62 and 64 can maneuver the machine in a given arc without having to hold it against forward movement. As the pile of corn is loosened, cable 26 can be lengthened to permit a wider arc of movement of this machine. As seen in FIG. 3 the pulley 98 is substantially elevated relative to the floor level of the bin 84 on which the roller 30 operates and if a bar 90 (FIG. 7) is used it will be at a comparable height. Consequently since cable 26 is maintained in a taut position (FIG. 3) as roller 30 is operating, the rearward end 18 of this kicker 10 is held in an elevated position during rotation of the roller 30 as illustrated.

Machine 10 as described has been successively demonstrated in actual operation and as indicated above loosens and deposits the greater portion of the packed ears of corn and projects them into the drag. What does not reach the drag is loosened, however, so that the drudgery of loosening the ears by manual methods is completely eliminated and what manual efforts may be required to scoop up the scattered ears is relatively minor. As a result, this machine because of its efficiency and inexpensive cost is a valuable improvement in corn moving operations as described.

It will be understood that the phraseology employed herein is for the purpose of description and not of limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. Apparatus for loosening and moving packed ears of corn in a corn crib, comprising an elongated frame having a forward and rear end respectively, a ground engaging roller rotatably carried by said forward end, a support member on said forward end, a motor mounted on said support member, drive means connecting said motor to said roller for rotating the same, a plurality of lugs secured to and radially projecting from the perimeter of said roller, said lugs during rotation digging into a pile of packed ears of corn to loosen said ears and propelling said loosened ears rearwardly relative to the direction of movement of said roller, means on said rear end for attachment to an elevated anchor so as to elevate said rear end during rotation of said roller, a handle on each side of said frame extending upwardly and outwardly therefrom, and a combination bumper and handle member secured to said forward end and projecting forwardly therefrom beyond the forwardmost extremity of said roller.

2. Apparatus for loosening and moving packed ears of corn in a corn crib, comprising an elongated frame having a forward and rear end respectively, a ground engaging roller rotatably carried by said forward end, a support member on said forward end, a motor mounted on said support member, drive means connecting said motor to said roller for rotating the same, a plurality of lugs secured to and radially projecting from the perimeter of said roller, said lugs during rotation engaging and loosening packed ears of corn and propelling said ears to a pick up point, a winch mounted cable on said rear end, said cable adapted for attachment to an elevated anchor so as to elevate said rear end during rotation of said roller, said cable when anchored serving as a control means for limiting the forward movement of said roller when rotating, a handle on each side of said frame extending upwardly and outwardly therefrom, and a combination bumper and handle member secured to said forward end and projecting forwardly therefrom beyond the forwardmost extremity of said roller.

3. Apparatus for loosening and moving packed ears of corn in a corn crib, comprising an elongated frame having a forward and rear end respectively, a ground angaging roller rotatably carried by said forward end, a plurality of band members secured circumferentially about said roller, said bands each provided with a plurality of longitudinally spaced threaded holes, lug members removably attachable to said band by threadable engagement in said holes in a selective pattern, said lugs projecting radially from said roller for engaging and propelling ears of corn, two of said bands being spaced apart to define a circumscribing groove or recess on said roller intermediate the ends thereof, a support member on said forward end, a motor on said support member, belt drive means on said motor, said belt mounted in said groove, means on said rear end for attachment to an elevated anchor so as to elevate said rear end during rotation of said roller, a handle on each side of said frame extending upwardly and outwardly therefrom, and a combination bumper and handle member secured to said forward end and projecting forwardly therefrom beyond the forwardmost extremity of said roller.

4. Apparatus for loosening and moving packed ears of corn in a corn crib, comprising an elongated frame having a forward and rear end respectively, a ground engaging roller rotatably carried by said forward end, a support member on said forward end, a motor mounted on said support member, drive means connecting said motor to said roller for rotating the same, a plurality of lugs secured to and radially projecting from the perimeter of said roller, a winch mounted cable on said rear end, a vertically adjustable ground supported standard spaced from said rear end, a pulley at the top of said standard, said cable reeved over said pulley and secured to a ground engaging anchor, the height of said pulley being such that the rear end of said frame is elevated during rotation of said roller, and a handle on each side of said frame extending upwardly and outwardly therefrom.

5. Apparatus for loosening and moving packed ears of corn in a corn crib, comprising an elongated frame having a forward and rear end respectively, a ground engaging roller rotatably carried by said forward end, a support member on said forward end, a motor mounted on said support member, drive means connecting said motor to said roller for rotating the same, a plurality of lugs secured to and radially projecting from the perimeter of said roller, said lugs engageable with ears of corn for propelling them from one point in a corn crib to another point therein, means on said rear end for attachment to an elevated anchor so as to elevate said rear end during rotation of said roller, a handle on each side of said frame, each handle extending upwardly and outwardly from respective sides of said rear end, then forwardly and parallel to said frame to a point forwardly of said forward end, and then downwardly and rearwardly to attachment to said forward end, and a combination bumper and handle member secured to said forward end and projecting forwardly therefrom beyond the forwardmost extremity of said roller.

6. Apparatus for loosening and moving packed ears of corn in a corn crib, comprising an elongated frame having a forward and rear end respectively, a ground engaging roller rotatably carried by said forward end, a support member on said forward end, a motor mounted on said support member, drive means connecting said motor to said roller for rotating the same, a plurality of lugs secured to and radially projecting from the perimeter of said roller for engaging and propelling ears of corn, means on said rear end for attachment to an elevated anchor so as to elevate said rear end during rotation of said roller, a handle on each side of said frame, each handle extending upwardly and outwardly from respective sides of said rear end, then forwardly and parallel to said frame to a point forwardly of said forward end, and then downwardly and rearwardly to attachment to said forward end.

7. Apparatus for loosening and moving packed ears of corn in a corn crib, comprising an elongated frame having a forward and rear end respectively, a ground engaging roller rotatably carried by said forward end, a support member on said forward end, a motor mounted on said support member, drive means connecting said motor to said roller for rotating the same, a plurality of lugs removably attachable to said roller in selective patterns of pairs and radially projecting from the perimeter thereof for engaging and propelling ears of corn, means on said rear end for attachment to an elevated anchor so as to elevate said rear end during rotation of said roller, a handle on each side of said frame extending upwardly and outwardly therefrom, and a combination bumper and handle member secured to said forward end and projecting forwardly therefrom beyond the forwardmost extremity of said roller.

8. Apparatus for loosening and moving packed ears of corn in a corn crib, comprising an elongated frame having a forward and rear end respectively, a ground engaging roller rotatably carried by said forward end, a support member on said forward end, a motor mounted on said support member, drive means connecting said motor to said roller for rotating the same, a plurality of groups of lugs in a predetermined pattern secured to and radially projecting from the perimeter of said roller for engaging and propelling ears of corn, means on said rear end for attachment to an elevated anchor so as to elevate said rear end during rotation of said roller, a handle on each side of said frame, each handle extending upwardly and outwardly from respective sides of said rear end, then forwardly and parallel to said frame to a point forwardly of said forward end, and then downwardly and rearwardly to attachment to said forward end.

9. Apparatus for loosening and moving packed ears of corn in a corn crib, comprising an elongated frame having a forward and rear end respectively, a ground engaging roller rotatably carried by said forward end, a support member on said forward end, a motor mounted on said support member, drive means connecting said motor to said roller for rotating the same, a plurality of lugs secured to and radially projecting from the perimeter of said roller for engaging and propelling ears of corn, means on said rear end for attachment to an elevated anchor so as to elevate said rear end during rotation of said roller, and a handle on each side of said frame.

10. Apparatus for loosening and moving packed ears of corn in a corn crib, comprising an elongated frame having a forward and rear end respectively, a ground engaging roller rotatably carried by said forward end, a support member on said forward end, a motor mounted on said support member, drive means connecting said motor to said roller for rotating the same, a plurality of lugs secured to and radially projecting from the perimeter of said roller for engaging and propelling ears of corn, means on said rear end for attachment to an elevated anchor so as to elevate said rear end during rotation of said roller, a handle on each side of said frame, each handle extending outwardly from respective sides of said rear end, then forwardly and parallel to said frame to a point forwardly of said forward end, and then downwardly and rearwardly to attachment to said forward end.

11. Apparatus for loosening and moving packed ears of corn in a corn crib, comprising an elongated frame having a forward and rear end respectively, a ground engaging roller rotatably carried by said forward end, drive means on said frame operatively connected to said roller for rotating the same for travel in one direction, a plurality of elongated lugs secured to and radially projecting from the perimeter of said roller, said lugs during rotation digging into a pile of packed ears of corn to loosen said ears and propelling said loosened ears rearwardly relative to the direction of movement of said roller, an elevated anchor, means connecting said frame to said anchor, and the height of said anchor being such that the rear end of said frame is elevated during rotation of said roller.

12. A device as defined in claim 11 wherein said lugs are arranged in a predetermined pattern of pairs.

13. Apparatus for loosening and moving packed ears of corn in a corn crib, comprising an elongated frame having a forward and rear end respectively, a ground engaging roller rotatably carried by said forward end, a support member on said forward end, a motor mounted on said support member, drive means connecting said motor to said roller for rotating the same, a plurality of lugs secured to and radially projecting from the perimeter of said roller, a winch mounted cable carried by said frame, said cable adapted for attachment to an elevated anchor so as to elevate said rear end during rotation of said roller, said cable when anchored serving as a control means for limiting the forward movement of said roller when rotating, and a handle means on said frame.

References Cited in the file of this patent

UNITED STATES PATENTS

| | | |
|---|---|---|
| 1,893,258 | Washburn | Jan. 3, 1933 |
| 1,979,530 | Clark | Nov. 6, 1934 |
| 2,153,609 | Briggs | Apr. 11, 1939 |
| 2,314,035 | Dontje | Mar. 16, 1943 |
| 2,736,544 | Wright | Feb. 28, 1956 |
| 2,765,157 | Hansen | Oct. 2, 1956 |
| 2,769,671 | Muniz | Nov. 6, 1956 |
| 2,816,804 | Harrer | Dec. 17, 1957 |

FOREIGN PATENTS

| | | |
|---|---|---|
| 606,647 | Germany | Dec. 7, 1934 |
| 1,019,620 | France | Nov. 5, 1952 |